(12) United States Patent
Suzuki et al.

(10) Patent No.: US 9,147,873 B2
(45) Date of Patent: Sep. 29, 2015

(54) METHOD OF PRODUCING AMORPHOUS CARBON MATERIAL FOR THE NEGATIVE ELECTRODE OF LITHIUM ION SECONDARY BATTERY, AND LITHIUM ION SECONDARY BATTERY

(71) Applicants: JX NIPPON OIL & ENERGY CORPORATION, Tokyo (JP); TODA KOGYO CORP., Hiroshima (JP)

(72) Inventors: Takashi Suzuki, Kanagawa (JP); Noriyo Ishimaru, Kanagawa (JP); Takashi Oyama, Yamaguchi (JP); Tamotsu Tano, Yamaguchi (JP); Toshiyuki Oda, Yamaguchi (JP); Ippei Fujinaga, Yamaguchi (JP); Tomoaki Urai, Hiroshima (JP); Seiji Okazaki, Hiroshima (JP); Katsuaki Kurata, Hiroshima (JP); Toshiaki Hiramoto, Hiroshima (JP); Akino Sato, Hiroshima (JP); Wataru Oda, Hiroshima (JP)

(73) Assignees: JX NIPPON OIL & ENERGY CORPORATION, Tokyo (JP); TODA KOGYO CORP., Hiroshima (JP)

( * ) Notice: Subject to any disclaimer, the term of this patent is extended or adjusted under 35 U.S.C. 154(b) by 50 days.

(21) Appl. No.: 13/896,825

(22) Filed: May 17, 2013

(65) Prior Publication Data

US 2013/0251621 A1 Sep. 26, 2013
US 2014/0161713 A2 Jun. 12, 2014

Related U.S. Application Data

(63) Continuation of application No. PCT/JP2011/075204, filed on Nov. 1, 2011.

(30) Foreign Application Priority Data

Nov. 17, 2010 (JP) .................................. 2010-256824

(51) Int. Cl.
| | | |
|---|---|---|
| *C01B 31/02* | (2006.01) | |
| *H01M 4/133* | (2010.01) | |
| *H01M 4/583* | (2010.01) | |
| *H01M 4/587* | (2010.01) | |
| *H01M 10/052* | (2010.01) | |

(52) U.S. Cl.
CPC ............... *H01M 4/133* (2013.01); *C01B 31/02* (2013.01); *H01M 4/583* (2013.01); *H01M 4/587* (2013.01); *H01M 10/052* (2013.01); *Y02E 60/122* (2013.01); *Y02T 10/7011* (2013.01)

(58) Field of Classification Search
CPC ....... C01B 31/02; H01M 4/583; C10B 47/00; C10B 47/28; C10B 55/00; C10B 57/045
USPC .................... 423/445 R; 429/231.8
See application file for complete search history.

(56) References Cited

U.S. PATENT DOCUMENTS

| 5,312,611 A | * | 5/1994 | Takami et al. ............. 423/447.6 |
| 5,958,622 A | | 9/1999 | Kojima et al. |
| 6,245,460 B1 | * | 6/2001 | Choi et al. ................. 429/231.4 |
| 2007/0258189 A1 | | 11/2007 | Tano et al. |
| 2010/0215567 A1 | | 8/2010 | Sakamoto et al. |

FOREIGN PATENT DOCUMENTS

| CN | 101010760 A | 8/2007 |
| CN | 101803077 A | 8/2010 |
| JP | 07-335217 | 12/1995 |
| JP | 10-199767 | 7/1998 |
| JP | 2009-076209 | 4/2009 |
| WO | WO 2011/152426 A1 | 12/2011 |

OTHER PUBLICATIONS

Kingo Ariyoshi, et al., "Cycleability on the LTO/LAMO Cells for 12 V "Lead-Free" Accumulators", Proceedings of the 76$^{th}$ Meeting of The Electrochemical Society of Japan, 1P29 (Mar. 26, 2009), p. 366.
Tetsuro Kobayashi, et al., "Change of Charge-Discharge Region for Lithium Ion Secondary Batteries by High-Temperature Storage", Proceedings of the 71$^{st}$ Meeting of The Electrochemical Society of Japan, 2107 (Mar. 24, 2004), p. 241.
Tetsuro Yokono, et al., "Characterization of Pitch II, Chemical Structure", Tanso No. 105, pp. 73-81 (1981).
Kingo Ariyoshi, et al., "Twelve-Volt "Lead Free" Accumulators consisting of LTO and LAMO: High and Low Temperature Examinations", Proceedings of the 48$^{th}$ Battery Symposium in Japan, 1A11, (Nov. 13, 2007), pp. 16-17.
"Procedure for the measurements of lattice parameters and crystallite sizes of carbon materials by X-ray diffraction.", The 117 Committee of the Japan Society for the Promotion of Sciences, TANSO 2006 (No. 221) pp. 52-60. Revised at Apr. 2005.
International Preliminary Report on Patentability and Written Opinion of the International Searching Authority issued by the International Bureau of WIPO in International Application No. PCT/JP2011/075204, dated Jun. 12, 2013 (12 pages).
Chinese Patent Office Action issued Jan. 6, 2015, for Chinese Application No. 201180065279.6.
Office Action of Chinese Patent Application No. 201180065279.6 issued Jul. 17, 2015.

* cited by examiner

*Primary Examiner* — Stuart Hendrickson
(74) *Attorney, Agent, or Firm* — Finnegan, Henderson, Farabow, Garrett & Dunner, L.L.P.

(57) ABSTRACT

A method for producing an amorphous carbon material for a negative electrode of a lithium-ion secondary battery includes the steps of; pulverizing and classifying a raw coke composition obtained from a heavy-oil composition undergone coking by delayed coking process to obtain powder of the raw coke composition, the raw coke composition having a H/C atomic ratio that is a ratio of hydrogen atoms H and carbon atoms C of 0.30 to 0.50 and having a micro-strength of 7 to 17 mass %; giving compressive stress and shear stress to the powder of the raw coke composition to obtain a carbonized composition precursor; and heating the carbonized composition precursor under an inert atmosphere at a temperature from 900° C. to 1,500° C. so that a size of a crystallite Lc(002) is in a range of 2 nm to 8 nm, the size being calculated from a (002) diffraction line obtained by X-ray wide-angle diffractometry.

1 Claim, 1 Drawing Sheet

METHOD OF PRODUCING AMORPHOUS CARBON MATERIAL FOR THE NEGATIVE ELECTRODE OF LITHIUM ION SECONDARY BATTERY, AND LITHIUM ION SECONDARY BATTERY

This application is a continuation application of PCT/JP2011/075204, filed on Nov. 1, 2011.

BACKGROUND OF THE INVENTION

1. Field of the Invention

The present invention relates to a method of producing amorphous carbon materials used for a negative electrode of a lithium ion secondary battery. More specifically, the present invention relates to amorphous carbon materials used for a negative electrode of a lithium ion secondary battery with suppressed capacity degradation and high durability and a lithium ion secondary battery including a negative electrode made of such an amorphous carbon material.

2. Description of Related Art

Lithium ion secondary batteries are light in weighted and have high input and output characteristics compared with conventional secondary batteries such as a nickel-cadmium battery, a nickel-metal hydride battery and a lead battery, and such lithium ion secondary batteries have been anticipated in recent years as power supplies for electric vehicles and hybrid vehicles. Typically these kinds of batteries include a lithium-containing positive electrode enabling reversible intercalation of lithium and a negative electrode including a carbon material, and these electrodes are opposed to each other via a non-aqueous electrolyte. As such, these kinds of batteries are assembled in a discharged state, and so will not be in a dischargeable state without charging. The following describes the charge and discharge reaction by way of an example including a lithium cobalt oxide ($LiCoO_2$) as the positive electrode, a carbon material as the negative electrode and a non-aqueous electrolyte solution containing lithium salt as an electrolyte.

During charge of a first cycle, lithium contained in the positive electrode is firstly released to the electrolyte solution (the following Formula 1), so that the positive electrode potential shifts to a noble (positive) direction. At the negative electrode, lithium released from the positive electrode is occluded by the carbon material (the following Formula 2), so that the negative electrode potential shifts to a less noble direction. Typically when a difference between the positive electrode potential and the negative electrode potential, i.e., battery voltage reaches a predetermined value, the charge is terminated. This value is called a charge termination voltage. Then, during discharging, lithium occluded by the negative electrode is released, so that the negative electrode potential shifts to a noble direction, and the lithium is occluded again by the positive electrode, so that the positive electrode potential shifts to a less noble direction. Similarly to the charging, discharge also is terminated when a difference between the positive electrode potential and the negative electrode potential, i.e., battery voltage reaches a predetermined value. That value is called a discharge termination voltage. The whole reaction formula of such charge and discharge will be as in the following Formula 3. In the following second cycle or later, the charge and discharge reaction (cycles) progresses as lithium moves between the positive electrode and the negative electrode.

[Formula 1]

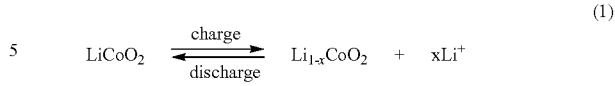

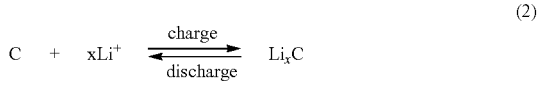

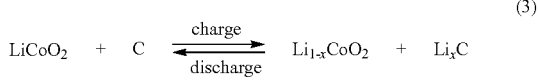

In general, carbon materials used for negative electrode materials of lithium ion secondary batteries are broadly divided into graphite materials and amorphous materials. Amorphous carbon materials typically refer to a material, which may include a very small amount of graphite crystals microscopically, but is a disorder aggregate and appears shapeless, and amorphous carbon materials in the present invention is broader than such a general concept and refers to a carbon material subjected to heat treatment at less than graphitization temperature of carbon.

Amorphous carbon materials have an advantage of having a higher output characteristic than graphite carbon materials. As such, amorphous carbon materials are used in a lithium ion secondary battery for vehicles and electric power storage infrastructure. A higher output characteristic is required for vehicles at the time of start from a stopped state and for electric power storage infrastructure at the time of leveling a sudden load fluctuation, for example.

As stated above, these kinds of batteries have been examined actively for the use as electric storage devices for vehicles, industry, and electric power supply infrastructure in recent years. When these batteries are used for these purposes, they are required to have an extremely high-degree of reliability compared with the usage for mobile phones or laptop computers. The term "reliability" is a property related to product life, referring to a property of hardly changing (hardly deteriorating) in charge and discharge capacity and the internal resistance during repeated charge and discharge cycles, during storage while being charged to be a predetermined voltage or while being charged (floating charged) continuously at a constant voltage.

Meanwhile, it is generally known that lithium-ion secondary batteries conventionally used for mobile phones and laptops have service life characteristics greatly depending on the negative electrode materials as well. One of the reasons is that, due to low charge and discharge efficiency at the negative electrode, it is impossible in principle to make the charge and discharge efficiency identical between the positive electrode reaction (Formula 1) and the negative electrode reaction (Formula 2). The charge and discharge efficiency refers to a ratio of dischargeable electric capacity to the electric capacity consumed by charging. The following is a detailed description on a reaction mechanism to degrade the service life characteristics due to such low charge and discharge efficiency of the negative electrode reaction.

During charging, lithium is released from the positive electrode (Formula 1) and is occluded by the negative electrode (Formula 2) as stated above, where the reactions at the positive electrode and the negative electrode consume the same amount of electric capacity during charging. The charge and discharge efficiency, however, is lower at the negative electrode, so that during the subsequent discharging reaction, the discharge is terminated in the state in which the amount of lithium released from the negative electrode is less than the amount of lithium that can be occluded on the positive electrode side, i.e., the amount of lithium that has been occluded before the charge on the positive electrode side. This is because a part of the electric capacity consumed by charge at the negative electrode is consumed by a side reaction and a competitive reaction and not by the reaction of occluding lithium, i.e., the occlusion reaction as dischargeable capacity.

As a result of such a charge and discharge reaction, the positive electrode potential at the discharge termination state shifts to a nobler direction than the original potential before the charge and discharge, and the negative electrode potential also shifts to a nobler direction than the original potential before the charge and discharge. This results from the following reason. All lithium, which has been released during the charge of the positive electrode, cannot be occluded (not return to) during discharging, and thus, during discharging to make the potential shifted to a noble direction during charging shift to a less noble direction, the potential cannot return to the original positive electrode potential by an amount corresponding to a difference in charge and discharge efficiency between the positive and negative electrodes. Then discharge is terminated at a nobler potential than the original positive electrode potential. As stated above, since the discharge of a lithium ion secondary battery ends when the battery voltage (i.e., a difference between the positive electrode potential and the negative electrode potential) reaches a predetermined value (discharge termination voltage), a nobler potential at the positive electrode at the time of discharge termination means that the negative electrode potential shifts accordingly to a noble direction.

As stated above, during the repeated charge and discharge cycles, these kinds of batteries produce a problem of a reduction in capacity obtainable within a predetermined voltage range (within the range between the discharge termination voltage and the charge termination voltage) due to a change of an operation range of the capacity of the positive and negative electrodes. Such reaction mechanism of the capacity degradation has been reported in an academic conference, for example, as well (e.g., Proceedings of the 48th Battery Symposium in Japan, 1A11 (Nov. 13, 2007) and Proceedings of the 76th Meeting of the Electrochemical Society of Japan, 1P29 (Mar. 26, 2009)). Once the operation range of the positive and negative electrode potentials changes, such a change is irreversible, and so the operation range cannot return to the original one in principle. There is no means to recover the capacity, which makes this problem more serious.

The above-described reaction mechanism causing capacity degradation during repeated charge and discharge cycles basically applies to a reaction mechanism for the capacity degradation during storage in a charged state or reaction mechanism for the capacity degradation during float-charge. When a battery is stored in a charged state, it is known that the amount of capacity lost by a side reaction and a competitive reaction which occur in a charged state is greater in the negative electrode than in the positive electrode, so that an operation range of the capacity of the positive and negative electrode changes between before and after storage and so the battery capacity after storage decreases (for example, Proceedings of the 71st Meeting of the Electrochemical Society of Japan, 2I07 (Mar. 24, 2004)). A difference in self discharge rate between the positive and negative electrodes under a charged state also owes to, similar to the above-mentioned difference in charge and discharge efficiency between the positive and negative electrodes, a side reaction or competitive reaction rate at the negative electrode under a charged state being higher than a side reaction or competitive reaction rate at the positive electrode in a charged state.

When a battery is float-charged, both the positive electrode and the negative electrode are charged at predetermined potentials continuously at the initial stage of charging. Actually, however, a current value (leakage current on the positive electrode side) necessary for keeping the positive electrode potential and a current value (leakage current on the negative electrode side) necessary for keeping the negative electrode potential are different. This results from, as described above, self discharge rates under a charged state are different between the positive electrode and the negative electrode and the self discharge rate of the negative electrode is larger. At the time of float charging, a leakage current becomes larger on the negative electrode side than on the positive electrode side, so that a negative electrode potential is shifted to the decreasing direction of a leakage current, that is, the noble direction and a positive electrode potential is shifted to the increasing direction of a leakage current, that is, the noble direction. In this way, during float-charge as well, an operation range of the capacity of the positive electrode and the negative electrode changes irreversibly, leading to degradation in battery capacity.

In general, lithium ion secondary batteries including a negative electrode made of an amorphous carbon material enable high input and output characteristics. Such a carbon material, however, is an amorphous material, and so has a higher ratio of crystallite edges that are exposed to the particle surface.

In general, there are a large number of dangling bonds at the edge parts of crystallites, that is, a valence electron bond is not saturated and many localized electrons are present without a binding partner. On the surface of a negative electrode carbon material during charge, that is, at the interface where an electrolyte solution comes into contact with the carbon material, a side reaction or a competitive reaction occurs because the localized electrons catalytically act to cause reduction decomposition of the electrolyte solution in addition to the intended charging reaction causing insertion of lithium in layers of reticulated planes, thus decreasing charge and discharge efficiency of the negative electrode. That is, crystallites in an isotropic state exposed to the surface increases reduction decomposition of the electrolyte solution, thus causing capacity degradation.

SUMMARY OF THE INVENTION

In order to suppress the aforementioned capacity degradation of lithium ion secondary batteries, it is an object of the present invention to develop a carbon material for negative electrodes that can suppress capacity degradation due to repeated charge and discharge cycles, storage under a charged state and float-charging, thus providing a material for negative electrodes of lithium ion secondary batteries for applications requiring a high degree of reliability, such as vehicles, industry and electric power storage infrastructure.

The present inventors noted the possibility of improving the charge and discharge efficiency of the negative electrode by providing an amorphous carbon material with less crystallite edges exposed at the particle surface, thus improving the reliability of a lithium ion secondary battery, and examined this in detail. As a result, the present inventors have achieved the present invention.

That is, in order to solve the aforementioned problems, a first aspect of the present invention is a method for producing an amorphous carbon material for a negative electrode of a lithium-ion secondary battery. The method includes the steps of: pulverizing and classifying a raw coke composition obtained from a heavy-oil composition undergone coking by delayed coking process to obtain powder of the raw coke composition, the raw coke composition having a H/C atomic ratio that is a ratio of hydrogen atoms H and carbon atoms C of 0.30 to 0.50 and having a micro-strength of 7 to 17 mass %; giving compressive stress and shear stress to the powder of the raw coke composition subjected to pulverizing and classifying to obtain a carbonized composition precursor; and heating the carbonized composition precursor under an inert atmosphere at a temperature from 900° C. to 1,500° C. so that a size of a crystallite Lc(002) is in a range of 2 nm to 8 nm, the size being calculated from a (002) diffraction line obtained by X-ray wide-angle diffractometry.

In order to solve the aforementioned problems, a second aspect of the present invention is a lithium ion secondary battery including the amorphous carbon material that is obtained by the manufacturing method according to the first aspect as a negative electrode material.

Amorphous carbon materials obtained by the manufacturing method of the present invention have less crystallite edges exposed to the particle surface. A lithium-ion secondary battery including a negative electrode made of such amorphous carbon materials can achieve high-degree of service life characteristics.

DESCRIPTION OF THE PREFERRED EMBODIMENTS

Figure 1:
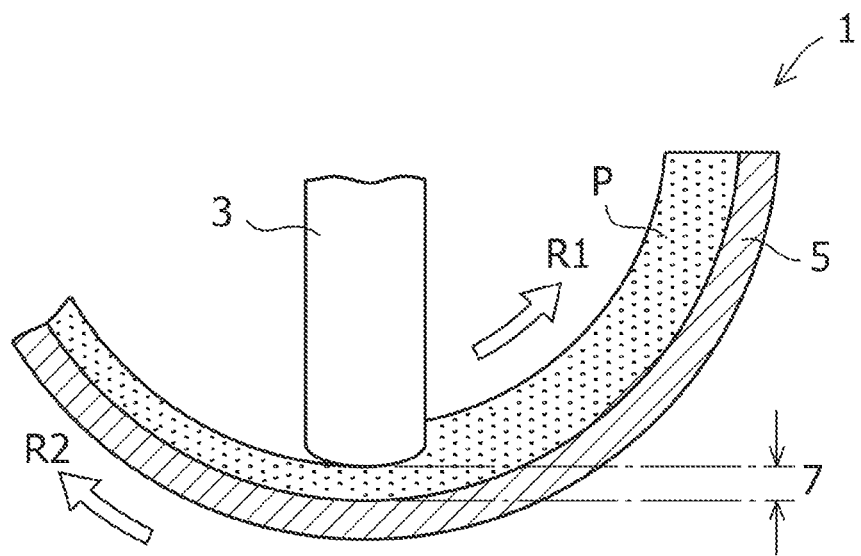
FIG. 1 shows an exemplary device to give compressive stress and shear stress.

A raw coke composition used to form an amorphous carbon material of the present invention is obtained from a heavy-oil composition undergone coking by delayed coking process and has a H/C atomic ratio, which is a ratio between hydrogen atoms H and carbon atoms C, from 0.30 to 0.50 and has a micro-strength from 7 to 17 mass %. The raw coke composition having such physical properties is subjected to pulverizing and classifying to obtain powder-form raw coke composition, followed by the application of compressive stress and shear stress thereto to obtain a carbonized composition precursor. Then, the carbonized composition precursor is carbonized, whereby crystallite edges exposed to the particle surface of the amorphous carbon material after the carbonization can be reduced.

Herein H/C of the raw coke composition is a ratio between a value obtained by dividing the total hydrogen content (TH (mass %)) by atomic weight of hydrogen and a value obtained by dividing the total carbon content (TC (mass %)) by atomic weight of carbon.

The total hydrogen can be found by complete combustion of a sample in an oxygen flow at 750° C., followed by measuring water content generated from combustion gas by a coulometric titration method (Karl Fischer method). In the coulometric titration-type Karl Fischer method, an electrolyte solution containing iodide ions, sulfur dioxide, base (RN) and alcohol as major components is put in a titration cell in advance, and then a sample is put in the titration cell so as to let water in the sample react as in the following Formula (4). Herein, the sample undergoes coking, and then is cooled under a dry atmosphere and is measured, for example:

$$H_2O+I_2+SO_2+CH_3OH+3RN \rightarrow 2RN.HI+RN.HSO_4CH_3 \quad (4).$$

Iodine necessary for this reaction can be obtained through an electrochemical reaction (bielectron reaction) of iodide ions as in the following Formula (5):

$$2I^-+2e^- \rightarrow I_2 \quad (5).$$

Since 1 mol of water and 1 mol of iodine react, an electric quantity necessary for titration of 1 mg of water can be found by Faraday's law as in the following Formula (6):

$$(2 \times 96478)/(18.0153 \times 10^3)=10.71 \text{ coulomb} \quad (6).$$

Herein, the constant 96478 is the Faraday constant, and 18.0153 is the molar weight of water.

The electric amount required for the generation of iodine is measured, whereby the water content can be found. Further based on the thus obtained water content, conversion into the hydrogen content is performed, which is then divided by the mass of the sample used for the measurement, whereby the total hydrogen content (TH (mass %)) can be calculated.

The total carbon can be found by combustion of a sample in an oxygen flow at 1,150° C. so as to be converted into carbon dioxide (partially carbon monoxide) and be conveyed by an excess oxygen flow to a $CO_2$+CO infrared detector for calculation of the total carbon content (TC (mass %)).

A raw coke composition having a H/C atomic ratio of 0.30 to 0.50, which is subjected to pulverizing and classifying to have a predetermined particle size and then receives compressive stress and shear stress, has the reticulated planes constituting thereof oriented so that crystallite edges do not appear at the particle surface. Since reticulated planes tend to be oriented vertically to the direction of stress applied, the particle surface of the carbonized composition precursor can be covered with the reticulated planes, and so crystallite edges located vertically to the reticulated planes hardly exist at the particle surface, meaning that extremely fewer crystallite edges exist at the particle surface of the carbon material after carbonization and so unorganized carbon causing decreased reliability of the battery can be reduced.

In the case of the H/C atomic ratio of the raw coke composition less than 0.30, reticulated planes constituting the raw coke composition expands widely, leading to tendency to an anisotropic particle shape after pulverization. Anisotropy refers to the property of a region of the reticulated planes and a region of crystallite edges easily separating at the particle surface. In such a case, since a region of aggregate of crystallite edges unfavorably occurs at the particle surface, compressive stress and shear stress applied later to the particles cannot promote the orientation of the reticulated planes at the particle surface of the carbonized composition precursor. When the carbonized composition precursor in such a particle state is carbonized, crystallite edges are easily exposed at the surface of the carbon material, which becomes a factor of decreased reliability of the battery.

On the other hand, in the case of the H/C atomic ratio of the raw coke composition exceeding 0.50, since the structure of its carbon frame is not formed sufficiently, the raw coke composition melts during the subsequent carbonization, thus greatly disturbing three-dimensional lamination arrangement of the reticulated planes. In such a case, when the raw coke composition is subjected to pulverizing and classifying to have a predetermined particle size, followed by the application of compressive stress and shear stress thereto for orientation of reticulated planes of a predetermined size so that crystallite edges do not appear at the particle surface, the resultant cannot maintain the three-dimensional orientation state for carbonization, thus easily exposing crystallite edges to the particle surface of the carbon material.

As stated above, the H/C of the raw coke composition is preferably from 0.30 to 0.50. A raw coke composition having a physical property in this range is subjected to pulverizing and classifying to have a predetermined particle size to obtain powder-form raw coke composition, and compressive stress and shear stress are then given thereto to obtain a carbonized composition precursor, which is then carbonized. The resultant carbon material can have a particle surface with extremely fewer crystallite edges.

The micro-strength is a value obtained as follows. That is, 2 g of a sample of 20 to 30 mesh and 12 pieces of rigid spheres of 5/16 inch (7.9 mm) in diameter are put in a steel cylinder (inner diameter 25.4 mm, length 304.8 mm) and the vertical face of the cylinder is rotated 800 times at 25 rpm in a direction orthogonal to the tube (i.e., rotated from the cylinder-standing state so that the top and the bottom of the cylinder are changed while keeping the rotational axis horizontal as if a propeller rotated). Thereafter sieving using 48 mesh is performed, and the value is obtained by representing the mass on the sieve with respect to the sample as a percentage.

The first aspect of the invention according to the present application further specifies the micro-strength of a raw coke composition of 7 to 17 mass %. This micro-strength is an index indicating a bonding strength between neighboring crystallites. Between neighboring crystallites typically exists unorganized carbon having a structure other than a benzene ring as a structural unit of the reticulated planes, which has a function of bonding neighboring crystallites. This unorganized carbon survives after carbonization of the raw coke composition and plays a similar role. The unorganized carbon herein refers to carbon that is not incorporated into carbon reticulated planes, and has a feature of being gradually captured into the carbon reticulated planes as the treatment temperature rises while inhibiting growth or selective orientation of neighboring carbon crystallites.

In the case of the micro-strength of the raw coke composition less than 7 mass %, the bonding strength between neighboring crystallites is extremely weak. When such a raw coke composition is subjected to pulverizing and classifying to have a predetermined particle size, to which compressive stress and shear stress are given, then the reticulated planes of an appropriate size constituting the raw coke composition are oriented so that crystallite edges do not appear at the particle surface, meaning a preferable structure as the state of the raw coke composition. On the other hand, since the bonding between crystallites is weak, the raw coke composition after carbonization cannot maintain the structure of the particle surface, and so the particle shape of the carbon material has strong anisotropy, and edges are easily exposed to the particle surface. This results from the bonding between crystallites in the state of the raw coke composition that is weaker than the stress due to the development of the crystallites during carbonization.

On the other hand, in the case of the micro-strength of the raw coke composition exceeding 17 mass %, the bonding strength between neighboring crystallites becomes extremely large. This is because unorganized carbon existing between neighboring crystallites configures a firm three-dimensional chemical bonding with its neighboring crystallites. Such a raw coke composition subjected to pulverizing and classifying to have a predetermined particle size, followed by the application of compressive stress and shear stress thereto, has difficulty in orientation of their reticulated plane as the particle surface. When compressive stress and shear stress larger than this bonding strength are given, the particles are more likely to be pulverized instead of forming the structure of reticulated planes of an appropriate size oriented at the particle surface. As a result, whether the particles are broken or not, crystallite edges easily are exposed at the particle surface.

As stated above, the micro-strength of the raw coke composition is limited to 7 to 17 mass %. A raw coke composition having a physical property in this range is subjected to pulverizing and classifying to have a predetermined particle size to obtain powder-form raw coke composition, and compressive stress and shear stress are then given thereto to obtain a carbonized composition precursor, which is then carbonized. Then, the resultant carbon material can keep the state of the reticulated planes of an appropriate size oriented at the particle surface after carbonization. As a result, the resultant amorphous carbon material can have a particle surface after carbonization with extremely fewer crystallite edges exposed to the particle surface. A lithium-ion secondary battery including a negative electrode made of such an amorphous carbon material can secure a very high-degree of reliability.

In this way, a raw coke composition having a H/C atomic ratio from 0.30 to 0.50 and having a micro-strength from 7 to 17 mass % is subjected to pulverizing and classifying to have a predetermined particle size, followed by the application of compressive stress and shear stress thereto to obtain a carbonized composition precursor. The resultant carbonized composition precursor includes crystallites of an appropriate size having their reticulated planes located at the particle surface, and so such a surface structure can be maintained after the carbonization.

A raw coke composition used for the present invention can be obtained by subjecting a heavy-oil composition to a coking treatment by a delayed coking process.

Exemplary components of the heavy-oil composition include bottom oil of fluid catalytic cracker (fluid catalytic cracking residue oil, FCC DO), an aromatic component extracted from fluid catalytic cracking residue oil, hydrodesulfurization oil obtained by highly hydrodesulfurization of heavy oil, vacuum residue oil (VR), desulfurized deasphalted oil, coal liquefaction oil, coal solvent extraction oil, atmospheric residue oil, shale oil, tar sand bitumen, naphtha tar pitch, ethylene bottom oil, coal tar pitch and heavy oil by hydrorefining of the foregoing. When two or more types of these heavy-oils are blended to prepare the heavy-oil composition, the blending ratio may be appropriately adjusted according to the properties of the stock oils used so that a raw coke composition obtained after coking by a delayed coking process of the heavy-oil composition has the H/C atomic ratio of 0.30 to 0.50 and the micro-strength of 7 to 17 mass % as physical properties thereof. The stock oil properties may vary depending on the type of crude oil and the processing conditions employed until the stock oil is obtained from the crude oil.

The bottom oil of fluid catalytic cracker may be bottom oil of a fluidized-bed fluid catalytic cracker that uses vacuum gas oil as stock oil and urging a selective decomposition reaction using a catalyst, thus obtaining high-octane FCC gasoline. The vacuum gas oil used as the stock oil is preferably desulfurized vacuum gas oil that is obtained by direct-desulfurization of atmospheric distillation residue oil (preferably sulfur content of 500 mass ppm or lower, density at 15° C. of 0.8 g/cm$^3$ or more).

The aromatic component extracted from fluid catalytic cracking residue oil is obtained as follows. Extraction is selectively performed using dimethylformamide or the like, and then the resultant is separated into an aromatic component and a saturated component, thus obtaining the aromatic component.

The hydrodesulfurization oil obtained by highly hydrodesulfurization of heavy oil is obtained by subjecting, for example, heavy oil having sulfur content of 1 mass % or more to a hydrodesulfurization treatment at the hydrogen partial pressure of 10 MPa or more, thus obtaining the heavy oil having sulfur content of 1.0 mass % or less, nitrogen content of 0.5 mass % or less and an aromatic carbon fraction (fa) of 0.1 or more. Then, the hydrodesulfurization oil is preferably one obtained by subjecting atmospheric distillation residue oil to hydrodesulfurization in the presence of a catalyst to give its hydrogenolysis rate of 25% or less.

The vacuum residue oil (VR) is obtained as follows. Crude oil is subjected to atmospheric distillation, thus obtaining gas, light oil and atmospheric residue oil, and this atmospheric residue oil is subjected under reduced pressure of 10 to 30 Torr and at a temperature ranging from 320 to 360° C., for example, thus obtaining bottom oil of the vacuum distillation as the vacuum residue oil (VR).

The desulfurized deasphalted oil is obtained by subjecting oil such as vacuum distilled residue oil to solvent deasphalting using propane, butane, pentane or the mixture of the foregoing as the solvent to remove the asphaltene component, thus obtaining deasphalted oil (DAO). Then, the thus obtained deasphalted oil (DAO) is desulfurized by indirect desulfurization equipment (Isomax) or the like to be the sulfur content of 0.05 to 0.40 mass %, preferably.

The atmospheric residue oil is obtained by subjecting crude oil to atmospheric distillation for heating under atmospheric pressure, for example, thus separating the components into gas•LPG, gasoline fraction, kerosene fraction, light oil fraction and atmospheric residue oil depending on different boiling points of the fractions included, among which the atmospheric residue oil is the fraction having the highest boiling point. The heating temperature varies with the production area of the crude oil, which is not limited in particular as long as these fractions can be obtained by fractional distillation, and for example, crude oil may be heated to 320° C.

Especially preferable exemplary heavy-oil compositions include a heavy-oil composition satisfying three conditions of: (1) having an aromatic carbon fraction (aromatic index) fa of 0.3 to 0.65; (2) having a normal paraffin content of 5 to 20 mass %; and (3) containing desulfurized deasphalted oil in the range of 7 to 15 mass %.

Heavy oil subjected to a high-temperature treatment generates thermal decomposition and polycondensation reactions, thus producing raw coke via the process to produce large liquid crystals known as mesophase as an intermediate product. At this time, it is especially preferable to use a heavy oil composition containing all of the following components: (1) a heavy-oil component forming favorable bulk mesophase; (2) a heavy-oil component that can produce gas having a function to limit the size of a reticulated planes lamination configuring the mesophase during polycondensation of the mesophase for carbonization and solidification, and further (3) a component bonding these disconnected reticulated planes laminations. (1) The heavy-oil component forming favorable bulk mesophase is a component giving 0.3 to 0.65 as the aromatic index fa, (2) the heavy-oil component that can produce gas is a component corresponding to 5 to 20 mass % of the normal paraffin content, and (3) the component bonding the reticulated planes laminations is the desulfurized deasphalted oil contained in the range of 7 to 15 mass %.

Such a heavy-oil composition is preferably used as a raw material of the raw coke composition of the present invention because reticulated planes formed with a heavy-oil component generating favorable bulk mesophase are limited to a relatively small size, and thus internal stress of particles against compressive stress and shear stress can be alleviated, and so crystallites can be oriented easily and particles can be deformed easily, and additionally the desulfurized deasphalted oil can bond neighboring reticulated plane laminations appropriately.

This is the first example to add desulfurized deasphalted oil to manufacture raw coke, and it is surprising that desulfurized deasphalted oil contained is effective.

The aromatic carbon fraction or aromatic index (fa) can be found by the Knight method. According to the Knight method, the distribution of carbon is, as the spectrum of aromatic carbon obtained by the $^{13}$C-NMR method, divided into three components ($A_1$, $A_2$, $A_3$), in which $A_1$ corresponds to the number of carbons in an aromatic ring, substituted aromatic carbons and half of unsubstituted aromatic carbons (corresponding to the peak of about 40 to 60 ppm in $^{13}$C-NMR), $A_2$ corresponds to the other half of the unsubstituted aromatic carbons (corresponding to the peak of about 60 to 80 ppm in $^{13}$C-NMR); and $A_3$ corresponds to the number of aliphatic carbons (corresponding to the peak of about 130 to 190 ppm in $^{13}$C-NMR). Based on these, fa is found by the following expression:

$$fa = (A_1 + A_2)/(A_1 + A_2 + A_3).$$

According to the document: "Characterization of Pitch II. Chemical Structure" Yokono and Sanada, Tanso No. 105, p 73-81 (1981), the $^{13}$C-NMR method is the best method for quantitatively determining fa, which is the most basic parameter among the chemical structure parameters of pitches.

The content of normal paraffin of the heavy oil composition is the value measured using a capillary column-mounted gas chromatograph. Specifically, after verification of normal paraffin with a reference substance, a non-aromatic component sample separated by the elution chromatography is passed through the capillary column for measurement. The content can be calculated from this measured value based on the total mass of the heavy oil composition.

When the aromatic index fa of the heavy-oil composition is less than 0.3, the yield of coke from the heavy-oil composition will be drastically degraded, and additionally favorable bulk mesophase cannot be formed and unfavorably a crystal structure is hardly developed during carbonization. On the other hand, the aromatic index fa exceeding 0.65 generates lots of mesophases suddenly in the matrix during the course of a raw coke composition. This will mainly cause sudden coalescence of mesophases instead of single growth of itself. As a result, since the coalescence rate of mesophases is larger than the generation rate of gas from the normal paraffin containing component, it becomes impossible to limit the size of reticulated planes of bulk mesophase to be small.

In this way, the aromatic index fa of the heavy-oil composition is especially preferably in the range of 0.3 to 0.6. The value of fa can be calculated from density D and viscosity V of the heavy-oil composition, and the heavy-oil composition especially preferably has the density D of 0.91 to 1.02 g/cm$^3$ and the viscosity of 10 to 220 mm$^2$/sec, and has the value of fa of 0.3 to 0.6.

The normal paraffin component appropriately contained in the heavy-oil composition plays an important role of generating gas during a coking treatment so as to limit the size of bulk mesophase to be small. The gas generated further has a function of allowing neighboring mesophases with a limited smaller size to be oriented uniaxially for selective orientation of the system as a whole. The content of the normal paraffin contained component less than 5 mass % leads to unnecessary growth of mesophases, so that huge carbon reticulated planes will be formed. The content exceeding 20 mass % causes excess generation of gas from the normal paraffin, which tends to act to disarrange the orientation of the bulk mesophase and causes difficulty in developing of a crystal structure even with carbonization. As stated above, the content of the normal paraffin is especially preferably in the range of 5 to 20 mass %.

As mentioned above, the desulfurized deasphalted oil plays a role of bonding neighboring reticulated plane laminations appropriately. The content of the desulfurized deasphalted oil in the heavy-oil composition is especially preferably in the range of 5 to 20 mass %. This is because, in the case of less than 5 mass % or exceeding 20 mass %, the coking oil composition obtained after coking will have a micro-strength of less than 7 mass % or exceeding 17 mass %.

The heavy-oil composition having such features is subjected to coking, whereby the raw coke composition of the present invention is formed. As a method for coking of a heavy-oil composition satisfying predetermined conditions, a delayed coking is preferable. More specifically, a preferable method is to heat-treat a heavy-oil composition by a delayed coker under a condition of controlled coking pressures to obtain a raw coke composition. At this time, preferable operational conditions of the delayed coker are the pressure of 0.1 to 0.8 MPa and the temperature of 400 to 600° C.

Such a preferable range is set for the operational pressure of the coker because the emission rate of gas generated from normal paraffin containing component to the outside the system can be limited by pressure. As stated above, since the size of carbon reticulated planes configuring mesophase is controlled by the gas generated, the residence time of the generated gas in the system is an important control parameter to determine the size of the reticulated planes. Such a preferable range is set for the operational temperature of the coker because such temperatures are required for the growth of mesophase from the heavy oil prepared to obtain the advantageous effects of the present invention.

The thus obtained raw coke composition is pulverized and classified using a mechanical pulverizer (e.g., "Super Rotor Mill", product of Nisshin Engineering), thus obtaining powder form raw coke composition. Then, the resultant is classified using a precision air classifier (e.g., "Turbo Classifier", product of Nisshin Engineering) to obtain a powder-form raw coke composition with the average particle size of 5 to 30 μm. The average particle size is based on the measurement by a laser diffraction particle size analyzer. The average particle size of 5 to 30 μm is set because the particle size less than 5 μm fails to give sufficient compressive stress and shear stress to the powder-form raw coke composition. The size of 30 μm or less is set because this size is typically suitably used as a negative electrode carbon material of a lithium ion secondary battery.

When compressive stress and shear stress are given to the powder-form coal raw coke composition, collision, friction and rheological stress also are generated as well as the compressive stress and shear stress. Mechanical energy from these stresses is greater than energy from general agitation, and so such energy given to the particle surface exerts the effect called a mechanochemical phenomenon such as spheronization of the particle shape or combination of particles. In order to give the mechanical energy to generate the mechanochemical phenomenon in the raw coke composition, a device capable of applying stresses such as shear, compression and collision simultaneously may be used, which is not limited especially for the structure and the principle of the device. For instance, a ball-type kneader such as a rotating ball mill, a wheel-type kneader such as an edge runner, a hybridization system (product of Nara Machinery Co., Ltd), Mechanofusion (product of Hosokawa Micron Corp.), Nobilta (product of Hosokawa Micron Corp.) and COMPOSI (product of Nippon Coke & Engineering Co., Ltd.) may be available, for example.

Manufacturing conditions at the step of giving compressive stress and shear stress may be different from the devices used, and for instance, as shown in FIG. 1, a mechanofusion device 1 may be used, including a blade 3 and a housing 5 that are relatively rotated, preferably in the mutually opposite directions (rotating directions R1, R2) so that compaction and compressive stress are applied to powder P at a space 7 between the blade and the housing.

When using Nobilta (product of Hosokawa Micron Corp.), the number of rotations of the blade is 1,500 to 5,000 rpm and the processing time is 10 to 180 minutes preferably. The number of rotations less than 1,500 rpm or the processing time less than 10 minutes fails to give sufficient compressive stress and shear stress to the powder-form raw coke composition. On the other hand, the processing longer than 180 minutes will give excessive compressive stress and shear stress to the powder-form raw coke composition, thus often causing marked deformation of the particle shape.

When using COMPOSI (product of Nippon Coke & Engineering Co., Ltd.), the circumferential velocity is 50 to 80 m/s and the processing time is 10 to 180 minutes preferably. The circumferential velocity smaller than 50 m/s or the processing time less than 10 minutes fails to give sufficient compressive stress and shear stress to the powder-form raw coke composition. On the other hand, processing longer than 180 minutes will give excessive compressive stress and shear stress to the powder-form raw coke composition, thus often causing marked deformation of the particle shape.

When using Mechanofusion (product of Hosokawa Micron Corp.), the number of rotations of the blade is 500 to 3,000 rpm and the processing time is 10 to 300 minutes preferably. The number of rotations smaller than 500 rpm or the processing time less than 10 minutes fails to give sufficient compressive stress and shear stress to the powder-form raw coke composition. On the other hand, processing longer than 300 minutes will give excessive compressive stress and shear stress to the powder-form raw coke composition, thus often causing marked deformation of the particle shape.

When using a hybridization system (product of Nara Machinery Co., Ltd), the circumferential velocity is 40 to 60 m/s and the processing time is 5 to 180 minutes preferably.

The raw coke composition in the present application is preferably processed at a control temperature ranging from 60 to 250° C. The operation at control temperatures for processing ranging from 120 to 200° C. is especially preferable. Such a temperature range to process the raw coke composition in the present application makes it easy to give uniform stress to the particle surface, whereby reticulated planes of an appropriate size can be selectively oriented at the particle surface vertically to the stress given. Then, since the raw coke composition in the present application can have such selective orientation, crystallite edges are hardly exposed to the particle surface after carbonization, and so a lithium-ion secondary battery including a negative electrode made of such a carbon material can have improved reliability.

The processing to apply compressive stress and shear stress to the particles of the raw coke composition is to grind corners of the particles, and as soon as they are ground, the ground parts are attached to particles to round the particles. Such processing is preferably performed so as not to change the apparent particle size substantially. In this way, this processing is not pulverization to generate minute powder and to make the particle size smaller. The raw coke composition includes a volatile component and so is adhesive, and this adhesiveness preferably acts to facilitate the prompt attachment of the ground parts to the particles.

The first aspect of the invention according to the present application includes a step of carbonizing a carbonized composition precursor by heating under an inert atmosphere so that a size of a crystallite Lc(002) is in the range of 2 to 8 nm, the size being calculated from a (002) diffraction line obtained by X-ray wide-angle diffractometry.

In the present invention, the size Lc(002) of a crystallite based on the (002) diffraction line measured by X-ray wide-angle diffractometry is 2 nm or more as a physical property of the carbon material. This is because the size less than 2 nm increases reversible capacity (maximum capacity enabling charge/discharge) as the carbon material, but tends to increase irreversible capacity during initial charge and discharge cycle as well. Since the irreversible capacity at the negative electrode is compensated for with lithium contained in the positive electrode, the battery has to be filled with a positive electrode material as much as possible in advance, and as a result, capacity as the battery decreases. On the other hand, the size Lc(002) of a crystallite based on the (002) diffraction line measured by X-ray wide-angle diffractometry exceeding 8 nm decreases irreversible capacity during initial charge and discharge cycle, but decreases reversible capacity as the carbon material, resulting in the tendency of decreasing the charge and discharge capacity as the battery as well.

A method for a carbonization treatment is not limited especially, and typically includes heating of a carbonized composition precursor under an inert gas atmosphere such as nitrogen, argon or helium at the maximum achieving temperature of 900 to 1,500° C. to be held for 0 to 10 hours.

In general, this kind of amorphous carbon material for use in a negative electrode of a secondary battery is obtained by heating a carbonized composition precursor such as an organic polymer, coal-tar pitch or petroleum pitch under an inert gas atmosphere. The heat treatment is typically at a temperature ranging from 900 to 1,500° C., and the carbon material heat-treated in this temperature range has the size Lc(002) of a crystallite in c-axis direction ranging from 2 to 8 nm.

The heat treatment temperature below 900° C. increases reversible capacity (maximum capacity enabling charge and discharge) as the carbon material, but tends to increase irreversible capacity during initial charge and discharge cycle as well. Since the irreversible capacity at the negative electrode is compensated for with lithium contained in the positive electrode, the battery has to be filled with a positive electrode material as much as possible in advance, and as a result, capacity as the battery decreases. On the other hand, the heat treatment temperature exceeding 1,500° C. decreases irreversible capacity during initial charge and discharge cycle, but decreases reversible capacity as the carbon material, resulting in the tendency of decreasing the charge and discharge capacity as the battery as well.

As stated above, a raw coke composition having a H/C atomic ratio of 0.30 to 0.50 and having the micro-strength of 7 to 17 mass % is subjected to pulverizing and classifying to have powder-form raw coke composition, and then compressive stress and shear stress are given to the powder-form raw coke composition, whereby a carbonized composition precursor is obtained. Then, the carbonized composition precursor is carbonized, whereby an amorphous carbon material having a size of a crystallite Lc(002) in the range of 2 to 8 nm, the size being calculated from a (002) diffraction line obtained by X-ray wide-angle diffractometry, can be obtained. A lithium-ion secondary battery including a negative electrode made of such an amorphous carbon material can secure very high-degree of reliability.

Herein, there has been no example for a lithium ion battery including a negative electrode made of a carbon material that is manufactured using desulfurized deasphalted oil as a raw material. According to the present invention, a heavy oil composition as a preferable embodiment includes the desulfurized deasphalted oil mixed therein, and a raw coke composition having predetermined H/C atomic ratio and such micro-strength is pulverized and classified to obtain powder-form raw coke composition. Compressive stress and shear stress are given to the powder-form raw coke composition, thus obtaining a carbonized composition precursor, and then the carbonized composition precursor is carbonized, whereby a desired amorphous carbon material can be provided.

A method for producing a negative electrode of a lithium ion secondary battery includes, but is not especially limited to, pressure molding of a mixture (negative electrode mixture) containing the carbon material according to the present invention, a binder (binding agent), and if necessary a conductive aid and organic solvent into a predetermined size. Another method for producing a negative electrode may include kneading of the carbon material according to the present invention, a binder (binding agent), a conductive aid and the like in an organic solvent to obtain a slurry, applying the slurry to a collector such as copper foil for drying (negative electrode mixture), rolling the same, and then cutting the roll into a predetermined size.

The amorphous carbon material for lithium ion batteries of the present invention may be mixed with a binder (binding agent) to be a mixture for negative electrode, and the mixture may be applied to metal foil, thus obtaining a negative electrode.

Examples of the binder, which is not limited especially and may be any conventionally used binder, include polyacrylonitrile (PAN), polyethylene terephthalate, polyvinylidene fluoride (PVDF), polytetrafluoroethylene (PTFE), polyvinyl fluoride and SBR (styrene-butadiene rubber).

The content of the binder is typically 1 to 40 parts by mass with respect to 100 parts by mass of the amorphous carbon material for lithium ion batteries of the present invention, is preferably 2 to 25 parts by mass and particularly preferably 5 to 15 parts by mass.

Examples of the conducting aid include carbon black, graphite, acetylene black, a conductive indium-tin oxide, or a conductive polymer such as polyaniline, polythiophene or polyphenylenevinylene. The amount of conducting aid used is preferably 1 to 15 parts by mass with respect to 100 parts by mass of the amorphous carbon material of the present invention.

The mixture for negative electrode is mixed with solvent in a slurry form.

Examples of solvent, which is not limited especially and may be any conventionally used solvent, include N-methylpyrrolidone (NMP), pyrrolidone, N-methylthio-pyrrolidone, dimethylformamide (DMF), dimethylacetamide, hexamethylphosphamide, isopropanol and toluene, which may be used alone or in combination.

The content of the solvent is typically 15 to 90 parts by mass with respect to 100 parts by mass of the mixture for negative electrode as a whole, and preferably 30 to 60 parts by mass.

The mixture for the negative electrode has to be dispersed appropriately at the degree of not breaking the carbon material for lithium ion batteries. To this end, the mixture for the negative electrode is appropriately mixed and dispersed using a planetary mixer, a ball mill, a screw-type kneader or the like.

The slurry-form mixture of the mixture for negative electrode and the solvent is applied to metal foil. A material for the metal foil is not limited especially, and may be made of various metal materials. Examples include copper, aluminum, titanium, stainless steel, nickel and iron. The mixture is applied to a single face or double faces of the metal foil, followed by drying, whereby an electrode can be made.

The mixture may be applied by a conventionally well-known method, such as extrusion coating, gravure coating, curtain coating, reverse-roll coating, dip coating, doctor coating, knife coating, screen printing, metal mask printing and electrostatic coating. The applying may be typically followed by rolling with a flat press or a calendar roll, if necessary.

An electrode may be manufactured by the application to the metal foil, followed by drying at a temperature of 50 to 250° C. In the case of applying the mixture to double sides of the metal foil, after drying at 50 to 250° C. following the application to a single face, the other face to be applied is particularly preferably washed with water or the like. This washing can improve the adhesiveness greatly.

Paste on the metal foil, which is the mixture applied to a single face or double faces of the metal foil, followed by drying, is pressed with the metal foil, whereby an electrode can be made.

The negative electrode of the present invention may have various shapes such as a plate shape, a film shape, a cylindrical shape or molding on metal foil suitable for the battery to be obtained. Among them, the shape that is molding on the metal foil can be particularly applied to various batteries as a collector-integrated negative electrode.

A lithium-ion secondary battery including the amorphous carbon material of the present invention as a negative electrode may be obtained by arranging the thus prepared negative electrode and a positive electrode for lithium-ion secondary battery so as to be opposed to each other via a separator, into which electrolyte solution is poured.

Examples of the active material used for the positive electrode include, but are not especially limited to, a metal compound, a metal oxide, a metal sulfide or a conductive polymer material capable of doping or intercalation with lithium ions, examples of which include lithium cobalt oxide ($LiCoO_2$), lithium nickel oxide ($LiNiO_2$), lithium manganase oxide ($LiMn_2O_4$), lithium complex oxides ($LiCo_XNi_YM_ZO_2$, X+Y+Z=1, M denotes Mn, Al or the like), a material containing other elements instead of a part of the foregoing transition metal, lithium vanadium compounds, $V_2O_5$, $V_6O_{13}$, $VO_2$, $MnO_2$, $TiO_2$, $MoV_2O_8$, $TiS_2$, $V_2S_5$, $VS_2$, $MoS_2$, $MoS_3$, $Cr_3O_8$, $Cr_2O_5$, olivine-type $LiMPO_4$ (M:Co, Ni, Mn or Fe), conductive polymers such as polyacetylene, polyaniline, polypyrrole, polythiophene and polyacene, porous carbon, and mixtures of the foregoing.

Examples of the separator to be used include nonwoven fabric, cloth and microporous film including mainly polyolefins such as polyethylene and polypropylene, as well as combinations thereof. It is not necessary to use the separator if the positive electrode and the negative electrode of the lithium ion secondary battery to be produced will not be in direct contact.

The electrolyte solutions and electrolytes used in the lithium-ion secondary battery may be well-known organic electrolyte solutions, inorganic solid electrolytes or polymer solid electrolytes. An organic electrolyte solution is preferable from the viewpoint of electrical conductivity.

Examples of organic electrolyte solutions include organic solvents including ethers such as dibutyl ether, ethyleneglycol monomethyl ether, ethyleneglycol monoethyl ether, ethyleneglycol monobutyl ether, diethyleneglycol monomethyl ether and ethyleneglycol phenyl ether; amides such as N-methylformamide, N,N-dimethylformamide, N-ethylformamide, N,N-diethylformamide, N-methylacetamide, N,N-dimethylacetamide, N-ethylacetamide and N,N-diethylacetamide; sulfur-containing compounds such as dimethyl sulfoxide and sulfolane; dialkylketones such as methyl ethyl ketone and methyl isobutyl ketone; cyclic ethers such as tetrahydrofuran and 2-methoxytetrahydrofuran; cyclic carbonates such as ethylene carbonate, butylene carbonate, propylene carbonate and vinylene carbonate; chain-like carbonates such as diethyl carbonate, dimethyl carbonate, methylethyl carbonate and methylpropyl carbonate; cyclic carbonate esters such as γ-butyrolactone and γ-valerolactone; chainlike carbonate esters such as methyl acetate, ethyl acetate, methyl propionate and ethyl propionate; N-methyl-2-pyrrolidinone; acetonitrile, nitromethane and the like. Any of these solvents may be used alone, or two or more thereof may be used in admixture.

Lithium salts may be used as solutes (electrolytes) in these solvents. Examples of typically known lithium salts include $LiClO_4$, $LiBF_4$, $LiPF_6$, $LiAlCl_4$, $LiSbF_6$, $LiSCN$, $LiCl$, $LiCF_3SO_3$, $LiCF_3CO_2$, $LiN(CF_3SO_2)_2$ and $LiN(C_2F_5SO_2)_2$.

Examples of the polymer solid electrolytes include polyethylene oxide derivatives and polymers including these derivatives, polypropylene oxide derivatives and polymers including these derivatives, phosphoric acid ester polymers, and polycarbonate derivatives and polymers including these derivatives.

EXAMPLES

The invention according to the present application will now be described in detail based on examples and comparative examples, with the understanding that these examples are in no way limitative on the invention.

1. Raw Coke Compositions and a Method for Producing Therefor (1) Raw Coke Composition a Atmospheric distillation residuum having the sulfur content of 3.1 mass % was hydrodesulfurized under the presence of a catalyst so that the hydrocracking ratio was 25% or less, thus obtaining hydrodesulfurization oil. Hydrodesulfurization conditions were the total pressure of 180 MPa, the hydrogen partial pressure of 160 MPa and the temperature of 380° C. Desulfurized vacuum light oil (having the content of sulfur of 500 mass-ppm and the density of 0.88 g/cm$^3$ at 15° C.) was fluid catalytic cracked, thus obtaining fluid catalytic cracking residue oil. This fluid catalytic cracking residue oil was selective-extracted with dimethylformamide so as to be separated into an aromatic component and a saturated component, among which the aromatic component was extracted. To the mixture of this extracted aromatic component and the hydrodesulfurization oil at the mass ratio of 8:1, desulfurized deasphalted oil was added so as to be 19 mass % (the mixture as a whole containing the desulfurized and deasphalted oil itself was 100 mass %), thus obtaining a heavy oil composition. This heavy oil composition was introduced to a delayed coker for coking under an inert gas atmosphere at 550° C., thus obtaining the raw coke composition a.

(2) Raw Coke Composition b

To the mixture of the extracted aromatic component of the fluid catalytic cracking residue oil and the hydrodesulfurization oil at the mass ratio of 8:1, which were obtained similarly to the manufacturing method of the raw coke composition a, was added desulfurized deasphalted oil so as to be 11 mass %, thus obtaining a heavy oil composition. This heavy oil composition was introduced to a delayed coker under an inert gas atmosphere at 550° C., thus obtaining the raw coke composition b.

(3) Raw Coke Composition c

To the mixture of the extracted aromatic component of the fluid catalytic cracking residue oil and the hydrodesulfurization oil at the mass ratio of 8:1, which were obtained similarly to the manufacturing method of the raw coke composition a, was added desulfurized deasphalted oil so as to be 4 mass %, thus obtaining a heavy oil composition. This heavy oil composition was introduced to a delayed coker under an inert gas atmosphere at 550° C., thus obtaining the raw coke composition c.

(4) Raw Coke Composition d

To the mixture of the extracted aromatic component of the fluid catalytic cracking residue oil and the hydrodesulfurization oil at the mass ratio of 6:1, which were obtained similarly to the manufacturing method of the raw coke composition a, was added desulfurized deasphalted oil so as to be 17 mass %, thus obtaining a heavy oil composition. This heavy oil composition was introduced to a delayed coker under an inert gas atmosphere at 550° C., thus obtaining the raw coke composition d.

(5) Raw Coke Composition e

To the mixture of the extracted aromatic component of the fluid catalytic cracking residue oil and the hydrodesulfurization oil at the mass ratio of 6:1, which were obtained similarly to the manufacturing method of the raw coke composition a, was added desulfurized deasphalted oil so as to be 11 mass %, thus obtaining a heavy oil composition. This heavy oil composition was introduced to a delayed coker under an inert gas atmosphere at 550° C., thus obtaining the raw coke composition e.

(6) Raw Coke Composition f

To the mixture of the extracted aromatic component of the fluid catalytic cracking residue oil and the hydrodesulfurization oil at the mass ratio of 6:1, which were obtained similarly to the manufacturing method of the raw coke composition a, was added desulfurized deasphalted oil so as to be 6 mass %, thus obtaining a heavy oil composition. This heavy oil composition was introduced to a delayed coker under an inert gas atmosphere at 550° C., thus obtaining the raw coke composition f.

(7) Raw Coke Composition g

To the mixture of the hydrodesulfurization oil and the fluid catalytic cracking residue oil at the mass ratio of 1:5, which were obtained similarly to the manufacturing method of the raw coke composition a, was added desulfurized deasphalted oil so as to be 15 mass %, thus obtaining a heavy oil composition. This heavy oil composition was introduced to a delayed coker under an inert gas atmosphere at 550° C., thus obtaining the raw coke composition g.

(8) Raw Coke Composition h

To the mixture of the hydrodesulfurization oil and the fluid catalytic cracking residue oil at the mass ratio of 1:5, which were obtained similarly to the manufacturing method of the raw coke composition a, was added desulfurized deasphalted oil so as to be 7 mass %, thus obtaining a heavy oil composition. This heavy oil composition was introduced to a delayed coker under an inert gas atmosphere at 550° C., thus obtaining the raw coke composition h.

(9) Raw Coke Composition i

To the mixture of the hydrodesulfurization oil and the fluid catalytic cracking residue oil at the mass ratio of 1:4, which were obtained similarly to the manufacturing method of the raw coke composition a, was added desulfurized deasphalted oil so as to be 19 mass %, thus obtaining a heavy oil composition. This heavy oil composition was introduced to a delayed coker under an inert gas atmosphere at 550° C., thus obtaining the raw coke composition i.

(10) Raw Coke Composition j

To the mixture of the hydrodesulfurization oil and the fluid catalytic cracking residue oil at the mass ratio of 1:4, which were obtained similarly to the manufacturing method of the raw coke composition a, was added desulfurized deasphalted oil so as to be 16 mass %, thus obtaining a heavy oil composition. This heavy oil composition was introduced to a delayed coker under an inert gas atmosphere at 550° C., thus obtaining the raw coke composition j.

(11) Raw Coke Composition k

To the mixture of the hydrodesulfurization oil and the fluid catalytic cracking residue oil at the mass ratio of 1:4, which were obtained similarly to the manufacturing method of the raw coke composition a, was added desulfurized deasphalted oil so as to be 11 mass %, thus obtaining a heavy oil composition. This heavy oil composition was introduced to a delayed coker under an inert gas atmosphere at 550° C., thus obtaining the raw coke composition k.

(12) Raw Coke Composition l

To the mixture of the hydrodesulfurization oil and the fluid catalytic cracking residue oil at the mass ratio of 1:4, which were obtained similarly to the manufacturing method of the raw coke composition a, was added desulfurized deasphalted oil so as to be 5 mass %, thus obtaining a heavy oil composition. This heavy oil composition was introduced to a delayed coker under an inert gas atmosphere at 550° C., thus obtaining the raw coke composition I.

(13) Raw Coke Composition m

To the mixture of the hydrodesulfurization oil and the fluid catalytic cracking residue oil at the mass ratio of 1:4, which were obtained similarly to the manufacturing method of the raw coke composition a, was added desulfurized deasphalted oil so as to be 3 mass %, thus obtaining a heavy oil composition. This heavy oil composition was introduced to a delayed coker under an inert gas atmosphere at 550° C., thus obtaining the raw coke composition m.

(14) Raw Coke Composition n

To the mixture of the hydrodesulfurization oil and the fluid catalytic cracking residue oil at the mass ratio of 1:3, which were obtained similarly to the manufacturing method of the raw coke composition a, was added desulfurized deasphalted oil so as to be 14 mass %, thus obtaining a heavy oil composition. This heavy oil composition was introduced to a delayed coker under an inert gas atmosphere at 550° C., thus obtaining the raw coke composition n.

(15) Raw Coke Composition o

To the mixture of the hydrodesulfurization oil and the fluid catalytic cracking residue oil at the mass ratio of 1:3, which were obtained similarly to the manufacturing method of the raw coke composition a, was added desulfurized deasphalted oil so as to be 7 mass %, thus obtaining a heavy oil composition. This heavy oil composition was introduced to a delayed coker under an inert gas atmosphere at 550° C., thus obtaining the raw coke composition o.

(16) Raw Coke Composition p

To the fluid catalytic cracking residue oil obtained similarly to the manufacturing method of the raw coke composition a was mixed n-heptane of the same volume for mixture, followed by selective extraction with dimethylformamide so as to be separated into an aromatic component and a saturated component, among which the saturated component was selectively extracted. To the mixture of the fluid catalytic cracking residue oil and this saturated component at the mass ratio of 1:1, desulfurized deasphalted oil was added so as to be 16 mass %, thus obtaining a heavy oil composition. This heavy oil composition was introduced to a delayed coker for coking under an inert gas atmosphere at 550° C., thus obtaining the raw coke composition p.

(17) Raw Coke Composition q

To the mixture of the fluid catalytic cracking residue oil obtained similarly to the manufacturing method of the raw coke composition a and the extracted saturated component of the mixture of the fluid catalytic cracking residue oil and n-heptane obtained similarly to the manufacturing method of the raw coke composition p at the mass ratio of 1:1, desulfurized deasphalted oil was added so as to be 11 mass %, thus obtaining a heavy oil composition. This heavy oil composition was introduced to a delayed coker for coking under an inert gas atmosphere at 550° C., thus obtaining the raw coke composition q.

(18) Raw Coke Composition r

To the mixture of the fluid catalytic cracking residue oil obtained similarly to the manufacturing method of the raw coke composition a and the extracted saturated component of the mixture of the fluid catalytic cracking residue oil and n-heptane obtained similarly to the manufacturing method of the raw coke composition p at the mass ratio of 1:1, desulfurized deasphalted oil was added so as to be 6 mass %, thus obtaining a heavy oil composition. This heavy oil composition was introduced to a delayed coker for coking under an inert gas atmosphere at 550° C., thus obtaining the raw coke composition r.

(19) Raw Coke Composition s

To the mixture of the fluid catalytic cracking residue oil obtained similarly to the manufacturing method of the raw coke composition a and the extracted saturated component of the mixture of the fluid catalytic cracking residue oil and n-heptane obtained similarly to the manufacturing method of the raw coke composition p at the mass ratio of 1:2, desulfurized deasphalted oil was added so as to be 19 mass %, thus obtaining a heavy oil composition. This heavy oil composition was introduced to a delayed coker for coking under an inert gas atmosphere at 550° C., thus obtaining the raw coke composition s.

(20) Raw Coke Composition t

To the mixture of the fluid catalytic cracking residue oil obtained similarly to the manufacturing method of the raw coke composition a and the extracted saturated component of the mixture of the fluid catalytic cracking residue oil and n-heptane obtained similarly to the manufacturing method of the raw coke composition p at the mass ratio of 1:2, desulfurized deasphalted oil was added so as to be 10 mass %, thus obtaining a heavy oil composition. This heavy oil composition was introduced to a delayed coker for coking under an inert gas atmosphere at 550° C., thus obtaining the raw coke composition t.

(21) Raw Coke Composition u

To the mixture of the fluid catalytic cracking residue oil obtained similarly to the manufacturing method of the raw coke composition a and the extracted saturated component of the mixture of the fluid catalytic cracking residue oil and n-heptane obtained similarly to the manufacturing method of the raw coke composition p at the mass ratio of 1:2, desulfurized deasphalted oil was added so as to be 4 mass %, thus obtaining a heavy oil composition. This heavy oil composition was introduced to a delayed coker for coking under an inert gas atmosphere at 550° C., thus obtaining the raw coke composition u.

2. Analysis of Raw Coke Compositions (1) Method for Measuring H/C Atomic Ratio of Raw Coke Compositions The total hydrogen of a raw coke composition was measured by complete combustion of a sample in an oxygen flow at 750° C., followed by measuring water content generated from combustion gas by a coulometric titration method (Karl Fischer's method). Then, the total carbon was measured by combustion of a raw coke composition sample in an oxygen flow at 1,150° C. so as to be converted into carbon dioxide (partially carbon monoxide) and be conveyed by an excess oxygen flow to a $CO_2+CO$ infrared detector for measurement.

H/C of the raw coke composition was calculated as a ratio between a value obtained by dividing the total hydrogen content (TH (mass %)) by atomic weight of hydrogen and a value obtained by dividing the total carbon content (TC (mass %)) by atomic weight of carbon. Table 1 shows the H/C values of the raw coke compositions a to u.

(2) Method for Measuring Micro-Strength of Raw Coke Compositions

The value of the micro-strength was measured as follows. That is, 2 g of a sample of 20 to 30 mesh and 12 pieces of rigid spheres of 5/16 inch (7.9 mm) in diameter were put in a steel cylinder (inner diameter 25.4 mm, length 304.8 mm) and the vertical face of the cylinder is rotated 800 times at 25 rpm in a direction orthogonal to the tube (i.e., rotated from the cylinder-standing state so that the top and the bottom of the cylinder are changed while keeping the rotational axis horizontal as if a propeller rotated). Thereafter sieving of 48 mesh was performed, and the value was obtained by representing the mass on the sieve with respect to the sample as a percentage. Table 1 shows the micro-strength of the raw coke compositions a to u.

3. Method for Manufacturing Carbon Materials (1) Carbon A to U

The thus obtained raw coke compositions a to u were each pulverized and classified using a mechanical pulverizer (e.g., "Super Rotor Mill", product of Nisshin Engineering), followed by classification using a precision air classifier (e.g., "Turbo Classifier", product of Nisshin Engineering), thus obtaining fine particles with the average particle size of 12 μm. Then, bulk density of these fine particles was measured, and the fine particles were then put into a compressive stress and shear stress application device, Nobilta 130, product of Hosokawa Micron Corp. so that the filling factor based on the bulk density was 50%. The device was operated under the condition of processing time of 60 minutes while controlling the number of rotations of the blade at 3,500 rpm, the gap between the blade and the housing at 3 mm and the processing temperature at about 130° C. The carbonized composition precursor, to which compressive stress and shear stress were thus applied, was carbonized using a roller hearth kiln, product of Takasago Industry Co., Ltd. under a nitrogen gas flow at the maximum achieving temperature of 1,200° C. to be held for 5 hours. The resultant carbon materials were called carbon A to U so as to correspond to the raw coke compositions a to u.

(2) Carbon V

The raw coke composition h was pulverized using a mechanical pulverizer (e.g., "Super Rotor Mill", product of Nisshin Engineering), followed by classification using a precision air classifier (e.g., "Turbo Classifier", product of Nisshin Engineering), thus obtaining powder-form raw coke composition with the average particle size of 12 μm. Then, bulk density of this powder was measured, and the powder was then put into a compressive stress and shear stress application device, Mechanofusion device AMS-Lab mode, product of Hosokawa Micron Corp. so that the filling factor based on the bulk density was 50%. The device was operated under the condition of processing time of 60 minutes while controlling the number of rotations of the inner piece at 2,650 rpm, the gap between the inner piece and the housing at 5 mm and the processing temperature at about 130° C. The carbonized composition precursor, to which compressive stress and shear stress were thus applied, was carbonized using a roller hearth kiln, product of Takasago Industry Co., Ltd., under a nitrogen gas flow at the maximum achieving temperature of 1,200° C. to be held for 5 hours. The resultant carbon material was called carbon V.

(3) Carbon W

The raw coke composition k was pulverized using a mechanical pulverizer (e.g., "Super Rotor Mill", product of Nisshin Engineering), followed by classification using a precision air classifier (e.g., "Turbo Classifier", product of Nisshin Engineering), thus obtaining powder-form raw coke composition with the average particle size of 12 μm. Then, compressive stress and shear stress were applied to this powder using COMPOSI CP-15 model, product of Nippon Coke & Engineering Co., Ltd., while setting the circumferential velocity at 76 m/s and the time at 60 minutes and controlling the processing temperature at about 130° C. The carbonized composition precursor, to which compressive stress and shear stress were thus applied, was carbonized using a roller hearth kiln, product of Takasago Industry Co., Ltd. under a nitrogen gas flow at the maximum achieving temperature of 1,200° C. to be held for 5 hours. The resultant carbon material was called carbon W.

(4) Carbon X

The raw coke composition n was pulverized using a mechanical pulverizer (e.g., "Super Rotor Mill", product of Nisshin Engineering), followed by classification using a precision air classifier (e.g., "Turbo Classifier", product of Nisshin Engineering), thus obtaining powder-form raw coke composition with the average particle size of 12 μm. Then, compressive stress and shear stress were applied to the powder using a hybridization system, HYB-1 model, product of Nara Machinery Co., Ltd, while setting the number of rotations at 8,000 rpm and the circumferential velocity at 100 m/s and the time at 10 minutes and controlling the processing temperature at about 130° C. The carbonized composition precursor, to which compressive stress and shear stress were thus applied, was carbonized using a roller hearth kiln, product of Takasago Industry Co., Ltd., under a nitrogen gas flow at the maximum achieving temperature of 1,200° C. to be held for 5 hours. The resultant carbon material was called carbon X.

(5) Carbon Y

The raw coke composition k was pulverized using a mechanical pulverizer (e.g., "Super Rotor Mill", product of Nisshin Engineering), followed by classification using a precision air classifier (e.g., "Turbo Classifier", product of Nisshin Engineering), thus obtaining powder-form raw coke composition with the average particle size of 12 μm. Then, bulk density of this powder was measured, and the powder was then put into a compressive stress and shear stress application device, Nobilta 130, product of Hosokawa Micron Corp. so that the filling factor based on the bulk density was 50%. The device was operated under the condition of processing time of 60 minutes while controlling the number of rotations of the blade at 3,500 rpm, the gap between the blade and the housing at 3 mm and the processing temperature of at about 130° C. The carbonized composition precursor, to which compressive stress and shear stress were thus applied, was carbonized using a roller hearth kiln, product of Takasago Industry Co., Ltd., under a nitrogen gas flow at the maximum achieving temperature of 850° C. to be held for 20 hours. The resultant carbon material was called carbon Y.

(6) Carbon Z

The raw coke composition k was pulverized using a mechanical pulverizer (e.g., "Super Rotor Mill", product of Nisshin Engineering), followed by classification using a precision air classifier (e.g., "Turbo Classifier", product of Nisshin Engineering), thus obtaining powder-form raw coke composition with the average particle size of 12 μm. Then, bulk density of this powder was measured, and the powder was then put into a compressive stress and shear stress application device, Nobilta 130, product of Hosokawa Micron Corp. so that the filling factor based on the bulk density was 50%. The device was operated under the condition of processing time of 60 minutes while controlling the number of rotations of the blade at 3,500 rpm, the gap between the blade and the housing at 5 mm and the processing temperature of at about 130° C. The carbonized composition precursor, to which compressive stress and shear stress were thus applied, was carbonized using a high-frequency heating furnace FVS-I-290/350, product of Fujidempa Kogyo. Co., Ltd., under a nitrogen gas flow at the maximum achieving temperature of 1,600° C. to be held for 5 hours. The resultant carbon material was called carbon Z.

4. Calculation of Size Lc(002) of a Crystallite of Carbon Materials

The obtained carbon materials were mixed with 5 wt % of a Si reference sample as an internal reference, which was put into a sample holder (25 mmφ (diameter)×0.2 mm t (thickness)) made of glass. Then measurement by X-ray wide-angle diffractometry was performed based on the method specified by Japan Society for the Promotion of Science, Committee No. 117 (Tanso 2006, No. 221, pp. 52 to 60), whereby the size Lc(002) of a crystallite of the carbon materials was calculated. The X-ray diffractometer used was ULTIMA IV, product of Rigaku Corporation, where CuKα radiation (Kβ filter Ni was used) was used as an X-ray source, and applied voltage and current to an X-ray vacuum tube were set at 40 kV and 40 mA, respectively.

The diffraction pattern thus obtained was analyzed also based on the method specified by Japan Society for the Promotion of Science, Committee No. 117 (Tanso 2006, No. 221, pp. 52 to 60). Specifically, the measurement data thus obtained is processed by smoothing and background removal, followed by absorption correction, polarization correction, and Lorentz correction. Then, using the peak position and value width of the (111) diffraction line of the Si reference sample for correction against the diffraction curve (002) of the carbon material, the crystallite size was calculated. The crystallite size L was calculated from the corrected peak half-value width using the following Scherrer equation. The measurement and analysis were each conducted three times and the average was set as Lc(002):

$$L = K \times \lambda / (\beta_0 \times \cos \theta_B) \quad \text{Scherrer equation,}$$

wherein L represents a crystallite size (nm);

K represents a shapefactor constant (=1.0);

λ represents a X-ray wavelength (=0.15406 nm);

$\theta_B$ represents a Bragg angle; and $\beta_0$ represents a half-value width (corrected value).

Measurement results of Lc(002) of the graphite powder are as shown in Table 1.

Figure 2:
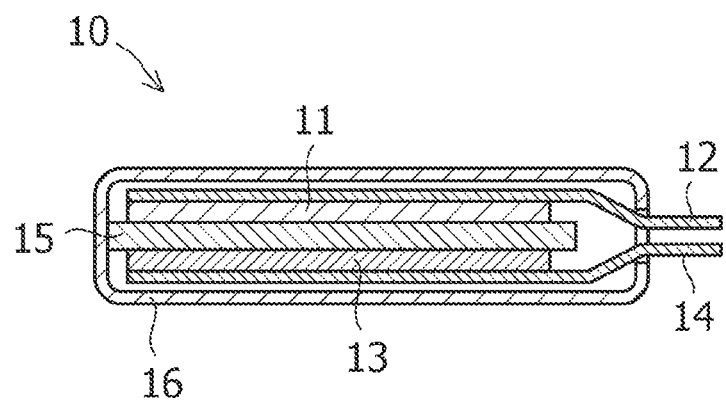
FIG. 2 schematically shows a cross-section of a cell used for battery evaluation examinations in the present examples.

5. Fabrication of Batteries and Method for Evaluating their Characteristics (1) Method for Fabricating Batteries FIG. 2 is a sectional-view of a fabricated battery 10. A positive electrode 11 was a sheet electrode formed by mixing lithium nickel oxide (produced by Toda Kogyo Corp., $LiNi_{0.8}Co_{0.15}Al_{0.05}O_2$) with the average particle size of 6 μm as a positive electrode material, polyvinylidene fluoride (produced by Kureha Corporation, KF#1320) as a binder and acetylene black (Denka black produced by Denki Kagaku Kogyo K.K.) at the mass ratio of 89:6:5, to which N-methyl-2-pyrrolidinone was added and kneaded, was made into a paste-form and was applied to a side face of aluminum foil of 30 μm in thickness, followed by drying and rolling, and was cut so that the size of the applied part was 30 mm in width and 50 mm in length. The amount applied per unit area was set at 10 mg/cm² as the mass of lithium nickel oxide.

At a part of this sheet electrode, the positive electrode mixture was scraped off orthogonally to the longitudinal direction of the sheet, and the thus exposed aluminum foil was connected with a collector 12 (aluminum foil) of the applied part in an integral manner, thus playing a role as a positive electrode lead plate.

A negative electrode 13 was a sheet electrode formed by mixing the carbon materials A to W as negative electrode materials, polyvinylidene fluoride (produced by Kureha Corporation, KF#9310) as a binder and acetylene black (Denka black produced by Denki Kagaku Kogyo K.K.) at the mass ratio of 91:2:8, to which N-methyl-2-pyrrolidinone was added and kneaded, was made into a paste-form and was applied to a side face of copper foil of 18 μm in thickness, followed by drying and rolling, and was cut so that the size of the applied part was 32 mm in width and 52 mm in length. The amount applied per unit area was set at 6 mg/cm² as the mass of graphite powder.

At a part of this sheet electrode, the negative electrode mixture was scraped off orthogonally to the longitudinal direction of the sheet, and the thus exposed copper foil was connected with a collector 14 (copper foil) of the applied part in an integral manner, thus playing a role as a negative electrode lead plate.

The battery was fabricated by drying the positive electrode 11, the negative electrode 13, a separator 15, an outer casing 16 and other components sufficiently, which were introduced into a glove box filled with argon gas having the dew point of −100° C. for assembly. As the drying conditions, the positive electrode and the negative electrode were dried at 150° C. under a vacuum state for 12 hours or longer, and the separator 15 and other components were dried at 70° C. under a vacuum state for 12 hours or longer.

The thus dried positive electrode 11 and negative electrode 13 were laminated so that the application part of the positive electrode and the application part of the negative electrode were opposed via micro-porous film (produced by Celgard Corp. #2400) made of polypropylene, which was fixed with a polyimide tape. Herein, the positive electrode and the negative electrode were laminated so that the perimeter part of the positive electrode application part that was projected onto the application part of the negative electrode was surrounded inside the perimeter part of the negative electrode application part. The thus obtained single-layer electrode body was embedded in an aluminum lamination film, to which electrolyte solution was poured, and the laminate film was heat-sealed while letting the aforementioned positive electrode and negative electrode lead plates stick out, thus fabricating a sealed single-layer laminate battery. The electrolyte solution used was obtained by dissolving lithium hexafluorophosphate ($LiPF_6$) in the solvent including the mixture of ethylene carbonate and ethylmethyl carbonate at the volume ratio of 3:7 so that the density was 1 mol/L.

(2) Method for Evaluating Batteries

The thus obtained batteries were set at a constant temperature room at 25° C., and the following charge and discharge experiment was conducted. Firstly, charge was conducted at a constant current of 1.5 mA until the battery voltage reached 4.2 V. After 10-minute pause, discharge was conducted at a constant current of the same current until the battery voltage reached 3.0 V, and such a charge and discharge cycle was repeated 10 times. Since this charge and discharge cycle was to check abnormality of the batteries, this was not included in the number of cycles for the charge and discharge experiment. It was found that all of the batteries fabricated in the present embodiment were free from abnormality.

Next, constant current/constant voltage charge was performed while setting the charge current at 15 mA, the charge voltage at 4.2 V and the charge time at 3 hours. After 1-minute pause, discharge was conducted at a constant current of the same current (15 mA) until the battery voltage reached 3.0 V. The discharge capacity obtained at this time was the discharge capacity at the first cycle. Such a charge and discharge cycle under similar conditions was repeated 1,000 times, and the ratio (%) of the discharge capacity at the 1,000th cycle to the discharge capacity at the first cycle was calculated. Table 1 shows the discharge capacity at the first cycle, the discharge capacity at the 1,000th cycle and the ratio (%) of the discharge capacity at the first cycle to the discharge capacity at the 1000th cycle.

TABLE 1

| Raw coke composition | H/C of Raw coke composition | Micro-Strength of Raw coke composition (%) | Conditions to Give Compressive Stress and Shear Stress | | | |
|---|---|---|---|---|---|---|
| | | | Devices | Number of Revolutions rpm | Circumferential Velocity m/sec. | Processing Time min. |
| a | 0.23 | 25 | Nobilta 130 | 3500 | — | 60 |
| b | 0.18 | 12 | Nobilta 130 | 3500 | — | 60 |
| c | 0.15 | 4 | Nobilta 130 | 3500 | — | 60 |
| d | 0.29 | 18 | Nobilta 130 | 3500 | — | 60 |
| e | 0.27 | 13 | Nobilta 130 | 3500 | — | 60 |
| f | 0.25 | 6 | Nobilta 130 | 3500 | — | 60 |
| g | 0.32 | 17 | Nobilta 130 | 3500 | — | 60 |
| h | 0.30 | 7 | Nobilta 130 | 3500 | — | 60 |
| i | 0.43 | 23 | Nobilta 130 | 3500 | — | 60 |
| j | 0.41 | 19 | Nobilta 130 | 3500 | — | 60 |
| k | 0.40 | 12 | Nobilta 130 | 3500 | — | 60 |

TABLE 1-continued

| | | | | | | |
|---|---|---|---|---|---|---|
| l | 0.39 | 6 | Nobilta 130 | 3500 | — | 60 |
| m | 0.38 | 3 | Nobilta 130 | 3500 | — | 60 |
| n | 0.50 | 16 | Nobilta 130 | 3500 | — | 60 |
| o | 0.49 | 8 | Nobilta 130 | 3500 | — | 60 |
| p | 0.53 | 18 | Nobilta 130 | 3500 | — | 60 |
| q | 0.52 | 13 | Nobilta 130 | 3500 | — | 60 |
| r | 0.51 | 5 | Nobilta 130 | 3500 | — | 60 |
| s | 0.73 | 21 | Nobilta 130 | 3500 | — | 60 |
| t | 0.70 | 11 | Nobilta 130 | 3500 | — | 60 |
| u | 0.66 | 4 | Nobilta 130 | 3500 | — | 60 |
| h | 0.30 | 7 | Mechanofusion AMS-Lab | 2650 | — | 60 |
| k | 0.40 | 12 | COMPOSI CP-15 | — | 76 | 60 |
| n | 0.50 | 16 | Hybridization System HYB-1 | 8000 | 100 | 10 |
| k | 0.40 | 12 | Nobilta 130 | 3500 | — | 60 |
| k | 0.40 | 12 | Nobilta 130 | 3500 | — | 60 |

| Raw coke composition | Carbonization Temp. (° C.) | Carbon Material Corresponding to Raw coke composition | Crystallite Size of Carbon Material Lc(002)(nm) | Discharge Capacity at 1st Cycle (mAh) | Discharge Capacity at 1000th Cycle (mAh) | Capacity Maintenance Ratio After 1000 Cycles (%) |
|---|---|---|---|---|---|---|
| a | 1200 | A | 6.1 | 15.8 | 11.8 | 74.7 |
| b | 1200 | B | 7.2 | 15.9 | 12.2 | 76.7 |
| c | 1200 | C | 8.0 | 15.8 | 12.1 | 76.6 |
| d | 1200 | D | 5.3 | 15.8 | 12.3 | 77.8 |
| e | 1200 | E | 5.6 | 15.3 | 12.3 | 80.4 |
| f | 1200 | F | 6.3 | 15.6 | 12.3 | 78.8 |
| g | 1200 | G | 5.2 | 14.9 | 13.3 | 89.3 |
| h | 1200 | H | 5.4 | 15.6 | 13.9 | 89.1 |
| i | 1200 | I | 3.2 | 15.1 | 12.0 | 79.5 |
| j | 1200 | J | 3.6 | 15.4 | 12.6 | 81.8 |
| k | 1200 | K | 3.5 | 15.2 | 14.1 | 92.8 |
| l | 1200 | L | 4.3 | 14.9 | 12.3 | 82.6 |
| m | 1200 | M | 4.5 | 15.4 | 12.3 | 79.9 |
| n | 1200 | N | 2.9 | 14.5 | 13.0 | 89.7 |
| o | 1200 | O | 3.2 | 14.5 | 12.9 | 89.0 |
| p | 1200 | P | 2.5 | 14.7 | 11.7 | 79.6 |
| q | 1200 | Q | 2.9 | 14.4 | 11.8 | 81.9 |
| r | 1200 | R | 2.6 | 14.5 | 11.5 | 79.3 |
| s | 1200 | S | 2.0 | 13.6 | 10.4 | 76.5 |
| t | 1200 | T | 4.0 | 15.2 | 12.1 | 79.6 |
| u | 1200 | U | 2.4 | 14.7 | 11.2 | 76.2 |
| h | 1200 | V | 8.0 | 15.6 | 14.3 | 91.7 |
| k | 1200 | W | 2.5 | 15.3 | 14.1 | 92.2 |
| n | 1200 | X | 2.0 | 15.0 | 13.4 | 89.3 |
| k | 850 | Y | 1.8 | 8.7 | 1.5 | 17.2 |
| k | 1600 | Z | 8.9 | 11.6 | 11.2 | 96.6 |

6. Consideration of Experimental Results

Table 1 shows the H/C values and the micro-strength of raw coke compositions a to u, the size Lc(002) of crystallites of carbon A to U corresponding to raw coke compositions a to u, discharge capacity (mAh) at the first cycle, the discharge capacity (mAh) at the 1,000th cycle and the capacity maintenance ratio (%) after the 1,000th cycle of the batteries, which were fabricated using these materials described as their negative electrodes. Herein, the capacity maintenance ratio (%) after the 1,000th cycle is the ratio of the discharge capacity after the 1,000th cycle to the discharge capacity at the first cycle, represented as percentage.

Carbon materials (G, H, K, N, O, V, W, X) only, obtained by giving compressive stress and shear stress to raw coke compositions having the H/C values of 0.3 to 0.5 and the micro-strength of 7 to 17 mass %, followed by carbonization so that crystallite sizes were 2 nm to 8 nm, secured the initial (at the first cycle) capacity of 14.5 mAh, and secured the capacity maintenance ratio after the 1,000th cycle of 89% or more.

On the other hand, carbon Z, used raw coke composition k having the H/C value and the micro-strength in the aforementioned ranges as a raw material, had the crystallite size Lc(002) of 8.9 nm, which was larger than 8 nm. Presumably this is because, whereas carbon K using the same raw coke composition k as a raw material was carbonized at 1,200° C., carbon Z was carbonized at 1,600° C., and thus whereas carbon K had the crystallite size Lc(002) of 3.5 nm, carbon Z had the crystallite size Lc(002) of 8.9 nm. It can be said that, since chargeable and dischargeable capacity of amorphous carbon materials (materials heat treated at a temperature of the graphitization initiation temperature or lower) typically tends to decrease with increases in the crystallite size Lc(002), just such a tendency was found in the present embodiment as well.

Then, carbon Y, used raw coke composition k as a raw material and manufactured by heat treatment at 850° C., had a small capacity of 8.7 mAh, and a small capacity maintenance ratio after 1,000 cycles of 17.2%. This is because too low heat treatment temperature increased irreversible capacity generated at the first cycle, so that the capacity as the battery decreased. Carbon Y had the crystallite size of 1.8 nm, which was smaller than the claimed range of the present invention (2 nm to 8 nm).

As stated above, it was shown that a raw coke composition having a H/C value of 0.3 to 0.5 and micro-strength of 7 to 17 mass % and following the application of compressive stress and shear stress to this raw coke composition, carbonization being performed so that crystallite size Lc(002) is 2 nm to 8 nm are essential to obtain the advantageous effects of the present invention.

A lithium-ion secondary battery including the amorphous carbon material according to the present invention as a negative electrode material can secure higher-degree of reliability compared with a lithium-ion secondary battery including a conventional amorphous carbon material, and thus such a lithium ion secondary battery is applicable to vehicles, specifically to hybrid vehicles, plug-in hybrid vehicles and electric vehicles as well as to industry such as electricity storage for electric system infrastructure.

It should be noted that the entire contents of Japanese Patent Application No. 2010-256824 filed on Nov. 17, 2010, on which the convention priority is claimed is incorporated herein by reference.

It should also be understood that many modifications and variations of the described embodiments of the invention will occur to a person having an ordinary skill in the art without departing from the spirit and scope of the present invention as claimed in the appended claims.

What is claimed is:

1. A method for producing an amorphous carbon material for a negative electrode of a lithium ion secondary battery, the method comprising:

pulverizing and classifying a raw coke composition obtained from a heavy-oil composition having undergone coking by a delayed coking process to obtain a powder of the raw coke composition, the raw coke composition having a H/C atomic ratio that is a ratio of hydrogen atoms H and carbon atoms C of 0.30 to 0.50 and having a micro-strength of 7 to 17 mass %;

subjecting the powder of the raw coke composition to compressive stress and shear stress to obtain a precursor for a carbonized composition; and heating the precursor under an inert atmosphere at a temperature from 900° C. to 1,500° C. to obtain the carbonized composition having a size of a crystallite Lc(002) in a range of 2 nm to 8 nm, the size being calculated from a (002) diffraction line measured by X-ray wide-angle diffractometry, wherein the heavy-oil composition comprises a desulfurized deasphalted oil.

* * * * *